C. L. PECK.
RECOVERY OF PROTEIDS FROM WASTE LIQUORS OF THE HIDE TREATING ART.
APPLICATION FILED JULY 20, 1918.
1,347,822. Patented July 27, 1920
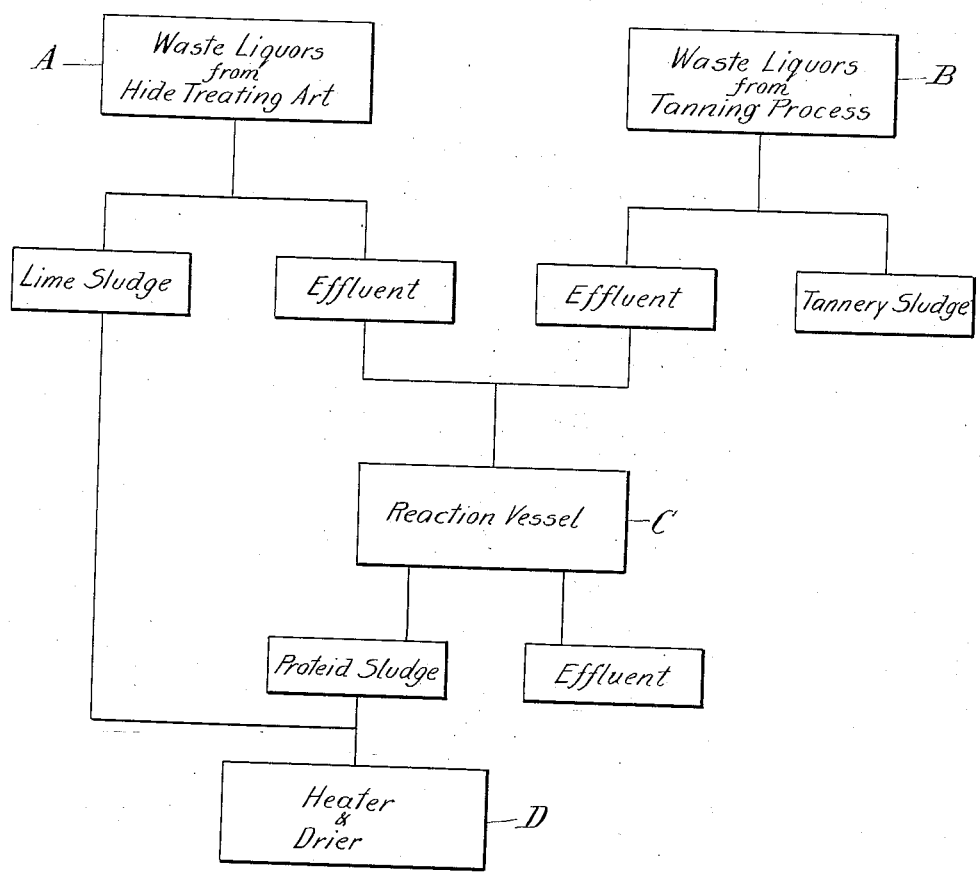

UNITED STATES PATENT OFFICE.

CHARLES LEE PECK, OF NEW YORK, N. Y., ASSIGNOR TO THE DORR COMPANY, OF NEW YORK, N. Y., A CORPORATION OF DELAWARE.

RECOVERY OF PROTEIDS FROM WASTE LIQUORS OF THE HIDE-TREATING ART.

1,347,822. Specification of Letters Patent. Patented July 27, 1920.

Application filed July 20, 1918. Serial No. 245,854.

*To all whom it may concern:*

Be it known that I, CHARLES LEE PECK, a citizen of the United States, residing at New York city, in the county of New York, State of New York, have invented certain new and useful Improvements in the Recovery of Proteids from Waste Liquors of the Hide-Treating Art; and I do hereby declare the following to be a full, clear, and exact description of the invention, such as will enable others skilled in the art to which it appertains to make and use the same.

In my application for Letters Patent of the United States, Serial No. 219,981, filed March 2, 1918, is set forth a method for the recovery of water-insoluble non-putrescible proteids from the waste liquors of the hide-treating art. Such waste liquors of the hide-treating art (say from the hide-cleansing process or from the hide-glue process, preliminary to tanning of the hide) contain proteid matter and lime salts.

The method described in said application consists in first separating such liquors by sedimentation into an effluent, carrying proteids partly in solution and partly in suspension, and a sludge containing caustic lime and calcium salts, hair, fleshings, and fragments of hide material together with fatty or greasy material and some sand and other foreign matter. The effluent is then treated with a waste liquor effluent from the tanning process, whereupon the proteids are precipitated as a sludge insoluble in water.

After the effluents have been taken over from the proteid sludge and from the lime sludge, both sludges still contain a considerable quantity of moisture, a portion of which it is desirable to eliminate, from one or the other, or from both, before admixing them in the next step of the process; it being desirable that the mixture contain as little as say 40 to 50% of moisture, so that it may seem almost dry. Thus, for instance, the desired reduction in the moisture content of the mixture may be cheaply and effectively produced by exposing the proteid sludge in a relatively thin layer to the drying action of the open air, and then mixing with it the lime sludge, in the proportions below given, so as to have a total moisture content, as low as is feasible (say from 40% to 50%) so that the mixture seems almost dry.

In general, a mixture made up of 100 parts by weight of proteid sludge (dried to a moisture content of say 25%) and 50 parts by weight of lime sludge (having a moisture content of say 70%) will present suitable proportions for the purposes of the invention, that is to say, will constitute a mixture wherein there is present and distributed throughout the mass a sufficient quantity of the calcium salts to react efficiently with the proteids present in the mixture. Heat facilitates the reaction, and, upon raising the temperature of the mass to the boiling point of water, it is found that a considerable proportion of the proteids is made water-soluble, so that the portion thus converted is immediately available as a fertilizer, without further treatment.

If, in addition to the 100 parts by weight of the proteid sludge and 50 parts by weight of the lime sludge there is incorporated in the mixture 10 parts by weight of soda ash, and the mixture is then brought to the temperature of boiling water, it is found that the amount of proteids made water-soluble is increased very considerably,—in some cases up to say 80% or more of the entire quantity of proteids present in the proteid sludge. This is probably due to reaction between the lime present and the soda ash resulting in the formation of caustic alkali (sodium hydrate) which is found to exercise a still more effective action upon the proteids in converting them into water-soluble or available condition. Furthermore, those ingredients of the lime sludge which contain nitrogenous matter, such as the hair, fleshings, and hide substances, are dissolved by the treatment, and the fatty or greasy materials present are saponified and likewise rendered soluble, so that when the fertilizer is finally spread upon the soil, there will be no balling or gumming which would occur to a greater or less degree if insoluble fatty materials were present.

The product resulting from the reaction, in addition to its availability, as described, as a fertilizer, is rendered non-putrescible by continuing the application of heat thereto for a sufficient length of time and at a sufficiently high degree to not only dry it thoroughly, but to destroy the bacteria present.

A special characteristic of the invention is that it permits the utilization of the lime sludge, not only for the recovery of the fertilizer values contained therein, but also as a source of lime in a caustic condition for reaction with the proteid sludge and also for reaction with the soda ash in the production of caustic alkali (sodium hydrate) with its still greater efficiency in the conversion of the proteids to the water-soluble condition and for its saponifying effects.

In the accompanying drawing is shown a flow sheet indicating diagrammatically the steps of the process. In this drawing, A indicates the sedimentation tank wherein the waste liquors from the hide-treating art are received and wherein their lime sludge is separated from the supernatant effluent. B indicates the tank or cistern for the storage and sedimentation of the waste liquors from the tanning process. C indicates the reaction tank or cistern wherein the combined effluents from the tanks or cisterns A and B are received and wherein the proteids held in solution and in suspension in the effluent from tank A are recovered as a proteid sludge or precipitate insoluble in water. D indicates the apparatus (of any suitable type, not shown) in which the mixture of the sludges, or the mixture of the sludges together with soda ash, is heated and eventually dried.

It will be understood that some of the advantages of the invention may be obtained by substituting caustic lime, or caustic lime and soda ash, or caustic lime and potash, or caustic alkali, for the lime sludge in the treatment of the precipitated proteids, or by substituting (in whole or in part) a sludge containing caustic lime or caustic alkali, but obtained from some other source than the waste liquors of the lime process of the hide treating art. These substitutions I regard as within the broader scope of the invention, although they obviously lack the more specific advantages, hereinbefore recited, incident to the use of the sludge from the hide-treating art.

What I claim is:

1. The method of recovering, from the waste liquors of the lime process of the hide-treating art, material available for use as a fertilizer, which consists in separating said liquors into a sludge and an effluent, precipitating the proteids contained in said effluent by subjecting them to the action of the waste liquors from the tanning process, and then heating the precipitated proteids in the presence of sodium hydroxid.

2. The method of recovering, from the waste liquors of the lime process of the hide-treating art, material available for use as a fertilizer, which consists in separating said liquors into a sludge and an effluent, precipitating the proteids contained in said effluent by subjecting them to the action of the waste liquors from the tanning process, and then heating the precipitated proteids in the presence of caustic lime and soda ash; substantially as described.

3. The method of recovering, from the waste liquors of the lime process of the hide-treating art, material available for use as a fertilizer, which consists in separating said liquors into a sludge and an effluent, precipitating the proteids contained in said effluent by subjecting them to the action of the waste liquors from the tanning process, and then heating the precipitated proteids in admixture with said sludge together with an alkali metal carbonate; substantially as described.

In testimony whereof I affix my signature.

CHARLES LEE PECK.